United States Patent [19]

Glew et al.

[11] Patent Number: 5,819,079
[45] Date of Patent: Oct. 6, 1998

[54] INSTRUCTION FETCH ON DEMAND FOR UNCACHEABLE MEMORY WHICH AVOIDS MEMORY MAPPED I/O SIDE EFFECTS IN A PROCESSOR WITH SPECULATIVE INSTRUCTION FETCH

[75] Inventors: Andrew F. Glew, Hillsboro; Ashwani Gupta, Beaverton, both of Oreg.

[73] Assignee: Intel Corporation, Santa Clara, Calif.

[21] Appl. No.: 526,540

[22] Filed: Sep. 11, 1995

[51] Int. Cl.$^6$ ........................................................ G06F 9/38
[52] U.S. Cl. .......................... 395/584; 711/139; 711/207; 711/313; 395/586; 395/800.23
[58] Field of Search ..................................... 711/139, 205, 711/707, 213; 395/584, 586, 800, 23

[56] References Cited

U.S. PATENT DOCUMENTS

| | | | |
|---|---|---|---|
| 4,604,691 | 8/1986 | Akagi | 395/383 |
| 5,142,634 | 8/1992 | Fite et al. | 395/587 |
| 5,307,477 | 4/1994 | Taylor et al. | 711/3 |
| 5,606,687 | 2/1997 | Mehring et al. | 711/139 |
| 5,613,083 | 3/1997 | Glew et al. | 711/207 |
| 5,615,402 | 3/1997 | Quattromani et al. | 395/800.38 |

*Primary Examiner*—Kenneth S. Kim
*Attorney, Agent, or Firm*—Blakely, Sokoloff, Taylor & Zafman

[57] ABSTRACT

A computer system includes an instruction prefetching mechanism that detects whether an instruction to be prefetched is located in a region of memory that is uncacheable. To perform an instruction prefetch, an instruction fetch unit (IFU) receives an instruction pointer indicating a memory location containing an instruction to be prefetched. The instruction pointer may be provided by a branch target buffer (BTB) as a result of a branch prediction, or by auxiliary branch prediction mechanisms, or actual execution. The IFU accesses an instruction translation look-aside buffer (ITLB) to determine both the physical address corresponding to the linear address of the instruction pointer and to determine an associated memory type stored therein. If the memory type indicates an uncacheable memory location, the IFU waits until all previous executed instructions have completed. The IFU does this by inserting a "permission-to-fetch" instruction, and then stalling. The IFU remains stalled until either the permission-to-fetch instruction retires or until a branch misprediction is detected. Once a branch misprediction is detected, the permission-to-fetch instruction and all other instructions issued subsequent to the mispredicted branch are squashed. If no previous branch mispredictions are detected, the permission-to-fetch instruction eventually retires, the instruction pointer is reset based on the correct branch, and prefetching continues.

10 Claims, 6 Drawing Sheets

INSTRUCTION FETCH ON DEMAND FOR UNCACHEABLE MEMORY WHICH AVOIDS MEMORY MAPPED I/O SIDE EFFECTS IN A PROCESSOR WITH SPECULATIVE INSTRUCTION FETCH

FIELD THE OF INVENTION

The invention generally relates to computer systems and, in particular, to a computer system having a microprocessor with a pre-fetching mechanism and a mechanism for performing branch predictions.

BACKGROUND OF THE INVENTION

Many state-of-the-art microprocessors employ general principles of superscalar design, such as described in the book "SuperScalar Microprocessor Design" by Mike Johnson, Prentice-Hall, Inc., 1991. Often, these modern microprocessors utilize techniques of "prefetching" to expedite the fetching of instructions from memory. With prefetching, instructions are typically accessed from main memory, or perhaps from an instruction cache, before the microprocessor has determined which instructions actually need to be fetched. With a "static" prefetch, the microprocessor prefetches the next one or two instructions which are stored sequentially in memory following the last verified instruction. If the prefetched instruction is subsequently verified as a correct instruction, then processing speed is improved because the instruction, once verified, is immediately available for execution. On the other hand, if the prefetched instruction is subsequently determined to be incorrect, perhaps because an instruction branch occurred, it is squashed and the correct instruction is then fetched. Since instructions typically are stored in memory in sequential order, a static prefetch mechanism which prefetches the next sequentially ordered instruction is often successful in improving processor efficiency. With some state-of-the-art microprocessors, a static prefetch mechanism can fetch five or more instructions ahead of the last verified instruction.

A problem can arise with static prefetching if memory mapped input/output (I/O), or other storage locations subject to memory accessing side effects, are located in the vicinity of instructions to be fetched. With static prefetching, it is possible to attempt a prefetch from a memory mapped I/O location even though that location was not intended to store an instruction. This can occur, for example, when an actual instruction stream branches over a portion of memory containing memory mapped I/O. Therefore a static instruction prefetch which fetches several instructions ahead of the last verified instruction might fetch into the memory mapped I/O region of memory before the branch is detected.

Figure 1:
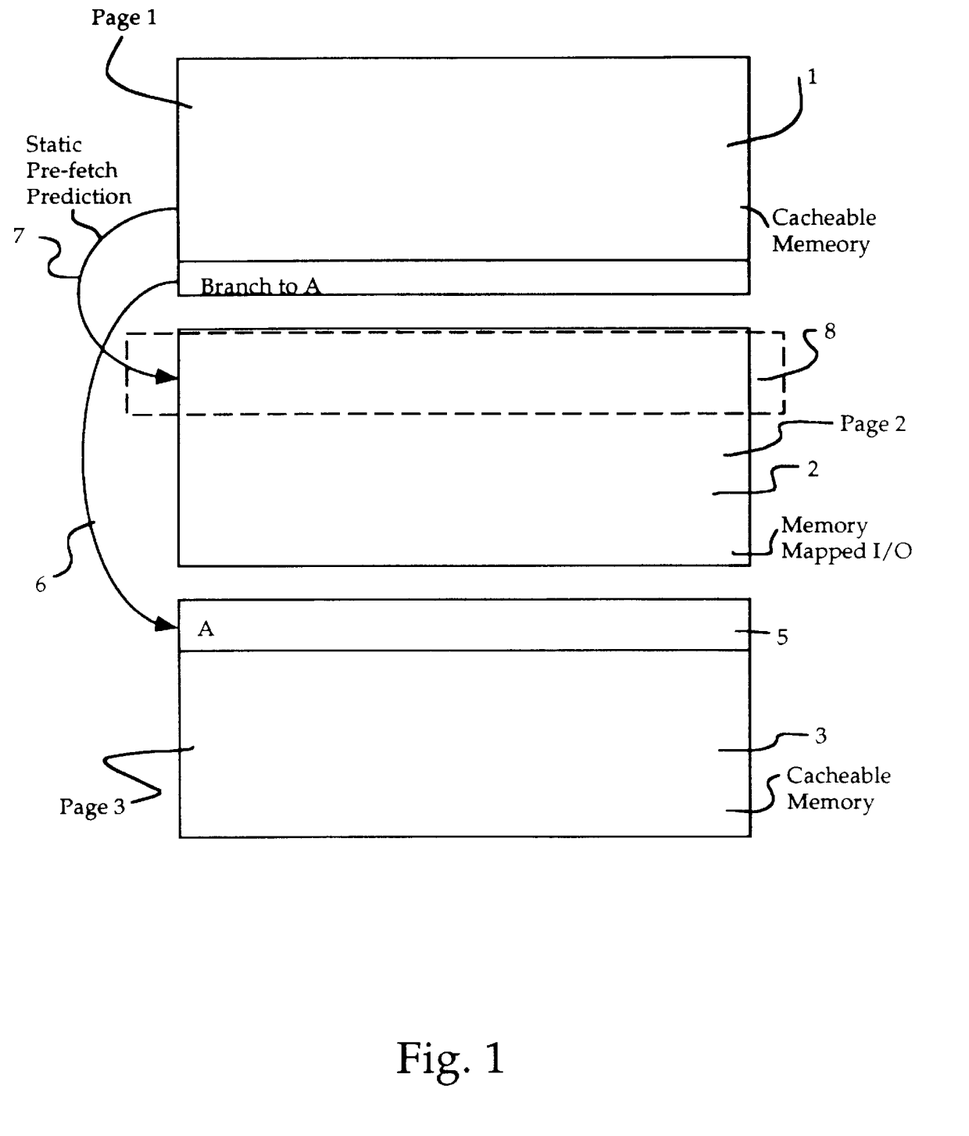
FIG. 1 is an example of a region of memory subject to a static prefetch.

This problem is illustrated in FIG. 1 which shows three pages of memory: pages 1, 2, and 3. Pages 1 and 3 store instructions, while page 2 stores memory mapped I/O. The instruction stored near the end of page 1 indicates a branch to instruction 5 in page 3. Arrow 6 illustrates the branch into page 3. The problem that can arise, however, is that the static prefetch (shown by arrow 7) might fetch from memory mapped I/O locations in page 2 before the branch at instruction 4 is detected. In such a case the memory mapped I/O locations may be corrupted.

To avoid such problems, computer designers have used several different strategies. According to a first scheme, prefetch is constrained to proceed no more than a fixed number of instructions ahead of the last executed instruction. For example, this design solution may be implemented by requiring at least 128 bytes between the branch to A and the first memory mapped I/O location, as shown by dashed line 8 in FIG. 1. The drawback of this approach, however, restricts performance since the number of instructions that may be prefetched is reduced.

A second scheme for avoiding memory mapped I/O side effect problems involves constraining prefetch to not cross "page" boundaries. In other words, code and memory mapped I/O is constrained so as not to coexist within the same page. Unfortunately, although many computer architectures (e.g., the Intel x86 architecture) implement 4K byte pages for memory translation, code plus memory mapped I/O has already been intertwined at a finer (e.g., 1K) granularity. Furthermore, restricting prefetch across such boundaries reduces performance in the common case where there are no memory mapped I/O side effects to be considered.

Additional prefetching problems arise within microprocessors capable of performing branch predictions. With branch prediction, a microprocessor attempts to predict which direction of a branch to execute before the controlling condition, e.g., of an IF statement is detected. The prediction is made before the branch condition is resolved. If prefetching is based upon a predicted branch which is subsequently determined to be incorrect, then memory mapped I/O may be accidentally pre-fetched before the branch misprediction can be detected.

Figure 2:
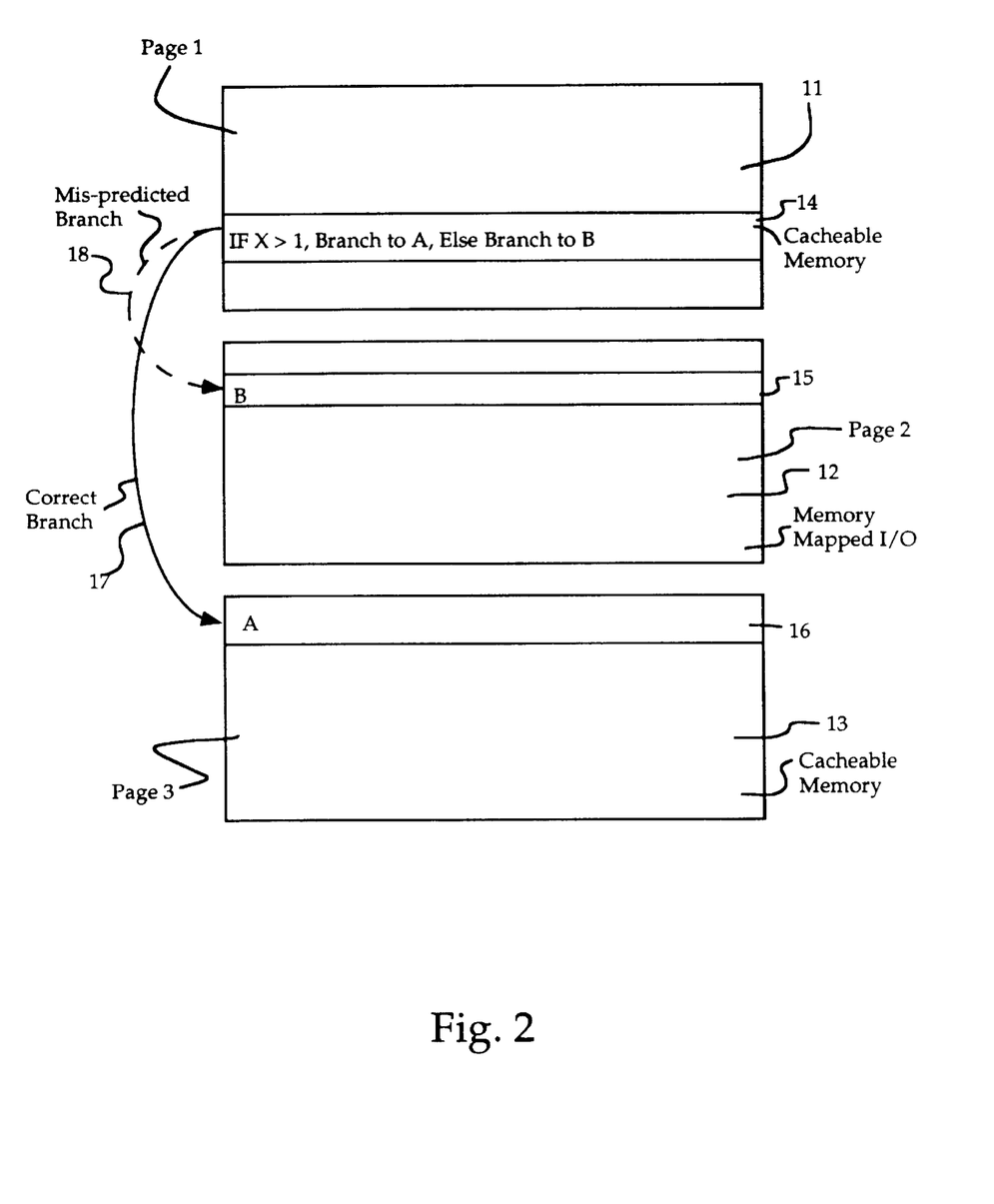
FIG. 2 is an example of a region of memory subject to a branch prediction prefetch.

This problem is illustrated graphically in FIG. 2. More specifically, FIG. 2 illustrates three pages of memory, generally denoted 11, 12 and 13, respectively. Pages 11 and 13 store instructions whereas page 12 stores memory mapped I/O. Instruction 14 stored within page 11 indicates a branch either to instruction 15 within the memory mapped I/O page 12 or to instruction 16 within page 13. The correct branch to be taken is the branch to memory instruction 16 (identified by a solid arrow 17.) However, as a result of an incorrect branch prediction, the microprocessor may predict that a branch to memory instruction 15 within the memory mapped I/O page is to be taken. The incorrect branch is denoted by a dashed line 18. As can be appreciated, a pre-fetched base upon the mispredicted branch will result in a prefetch from memory mapped I/O which may have undesirable side effects resulting in corruption of data or other non-recoverable errors.

At this point one might wonder why a processor would ever predict a branch to a memory-mapped I/O location. For instance, if the processor is guaranteed to only predict branch targets which are executable code, illegal prefetch from memory mapped I/O could not occur. Practitioners in the art should understood, however, that there are numerous situations in which it is convenient to allow a prediction to be made to a location which is not necessarily legal code. By way of example, one such situation arises where a location that previously stored code is now memory mapped I/O. This could occur, for example, as a result of bank switching or virtual address remapping. If a prediction could not be made to this location, branch target buffer (BTB) invalidation might be required whenever a bank switch or virtual address remapping occurs.

Because there are good reasons for allowing a BTB to make dynamic predictions that may possibly be incorrect, it becomes imperative to provide some mechanism which prevents prefetch from memory mapped I/O to avoid the undesirable side effects described above. Accordingly, there is an unfulfilled need for an improved method of prefetching instructions; particularly one which permits some prefetching based on branch predictions, and does not impose significant programming restrictions on the computer system.

SUMMARY OF THE INVENTION

The present invention is a computer having an instruction prefetching mechanism that detects whether an instruction to be prefetched is in an uncacheable memory region that might possibly contain memory mapped I/O. If so, the prefetch is deferred until it is verified that the location is correct, i.e., actually supposed to be executed. The deferral of a prefetch is performed only for prefetches to uncacheable memory regions. Prefetches to other memory locations—such as cacheable memory locations—are not deferred and, in general, may proceed aggressively. By deferring prefetches to uncacheable memory regions until it is determined that an uncacheable location is correct, unintentional side effects are avoided.

In one embodiment, the determination of whether the instruction to be prefetched is located in an uncacheable memory region is accomplished by examining a memory type value which identifies the memory type of the page of memory containing the storage location to be prefetched. Each page of memory has a separate memory type associated with it. For a page of memory containing uncacheable memory regions—or other types of memory subject to side effects (e.g. memory mapped I/O)—the memory type is designated as uncacheable (UC). The memory type for any particular page is determined during a page table walk by a page miss handler (PMH) of the microprocessor. The memory type, once determined, is stored within an instruction translation look-aside buffer (ITLB) to facilitate determination of the memory type for any particular memory location subject to an instruction prefetch.

In an exemplary embodiment, to perform an instruction prefetch, an instruction fetch unit (IFU) receives an instruction pointer indicating a memory location containing an instruction to be prefetched. The instruction pointer may be provided by a branch target buffer (BTB) as a result of a branch prediction, or by auxiliary branch prediction mechanisms, or actual execution. In the event that no external instruction pointer is received, the IFU initiates a static prefetch based upon the last instruction pointer received. Upon determining the instruction pointer for the prefetch, the IFU accesses an ITLB to determine both the physical address corresponding to the linear address of the instruction pointer and to determine the associated memory type. If the memory type indicates an UC memory location, the IFU waits until all previous executed instructions have completed. The IFU does this by inserting a "permission-to-fetch" instruction, and then stalling.

The IFU remains stalled until either the permission-to-fetch instruction retires or until a branch misprediction that would "cancel" the permission-to-fetch instruction is detected. Once a branch misprediction is detected, the permission-to-fetch instruction and all other instructions issued subsequent to the mispredicted branch are squashed. If no previous branch mispredictions are detected, the permission-to-fetch instruction eventually "retires". "Retirement" is a term that means that the instruction is not subject to any previous unresolved condition and can therefore be fully executed. It also refers to the processor being committed to a new state as defined by the instruction.

In accordance with one embodiment of the present invention, a reordering buffer (ROB) is utilized to determine whether an instruction can be retired. This process involves the ROB transmitting a signal which grants the IFU permission to fetch from the memory location specified by the current instruction pointer; i.e., all instructions preceding the "permission-to-fetch" instruction have completed. At this point the IFU proceeds to fetch the instruction from memory and to resume further prefetching.

On the other hand, if a branch misprediction is detected before the permission-to-fetch instruction has retired, the permission-to-fetch instruction and all other instructions subsequent to the mispredicted branch are squashed. The instruction pointer is then reset based on the correct branch, and prefetching continues. If the new instruction pointer again points to UC memory, the IFU dispatches another permission-to-fetch instruction and the IFU is again stalled. At a given time, only a single permission-to-fetch instruction is pending.

BRIEF DESCRIPTION OF THE DRAWINGS

The present invention will be understood for fully from the detailed description which follows and from the accompanying drawings, which however, should not be taken to limit the invention to the specific embodiments shown, but rather are for explanation and understanding only.

DETAILED DESCRIPTION

The present invention is a computer system having an innovative instruction prefetching mechanism. In the following description, numerous specific details are set forth, such as particular architectures, functional units, operations, etc., in order to provide a thorough understanding of the present invention. It should be understood, however, that these specific details need not be used to practice the present invention. In other instances, well known structures, circuits, methods, etc., have not been shown in detail or have been presented in block diagram form in order to avoid obscuring the invention.

Figure 3:
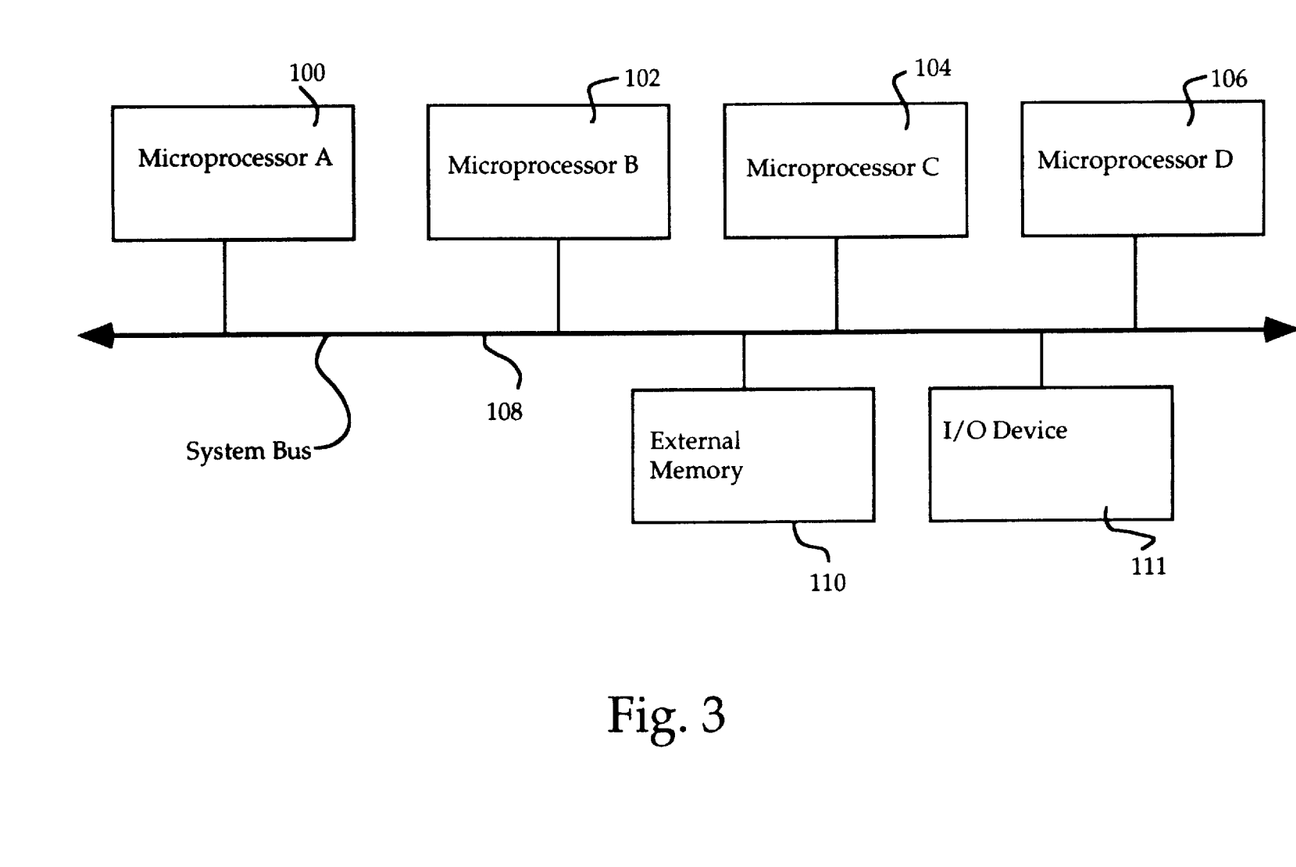
FIG. 3 is a block diagram illustrating a computer system which includes multiple microprocessors configured in accordance with one embodiment of the invention.

Referring now to FIG. 3, there is shown a multiprocessor computer system according to one embodiment of the invention. The system includes four individual microprocessors 100, 102, 104, and 106 interconnected by a system bus 108. A main memory 110 and an input/output device 112 are also connected to system bus 108. Main memory 110 may include a wide range of memory storage units including ROM's RAM's and the like. I/O device 112 may include any of a number of input or output devices such as keyboards, CRT displays, and the like. Each of the microprocessors illustrated in FIG. 3 may be identical. Each microprocessor is capable of speculative, "out-of-order" execution of instructions. By out-of-order, it is meant that the microprocessor is capable of executing an instruction out of the original order of instructions forming a computer program. Speculative execution, on the other hand, refers to the ability to execute an instruction which occurs subsequent to a branch condition (such as an IF statement) before the branch condition is actually resolved. The microprocessor attempts to predict which branch direction is most likely to be taken; then processes instructions occurring along the predicted branch. Such operations are termed "speculative" since it is unknown whether the operations can actually be committed to a permanent, architectural state until the branch condition is resolved. If the branch prediction is found to be correct, then the speculatively executed instructions are committed to memory, i.e., the speculative instructions are retired. However, if the branch condition is found to be incorrect, then the speculatively executed instructions are squashed or otherwise flushed from the system.

Although the exemplary embodiment of FIG. 3 is shown including microprocessors capable of speculative and/or out-of-order execution of instructions, it should be understood that the concepts of the present invention may be applied to in-order and/or non-speculative microprocessors. In fact, the present invention is applicable to computer systems which include any type of processor that performs prefetching of instructions.

Figure 4:
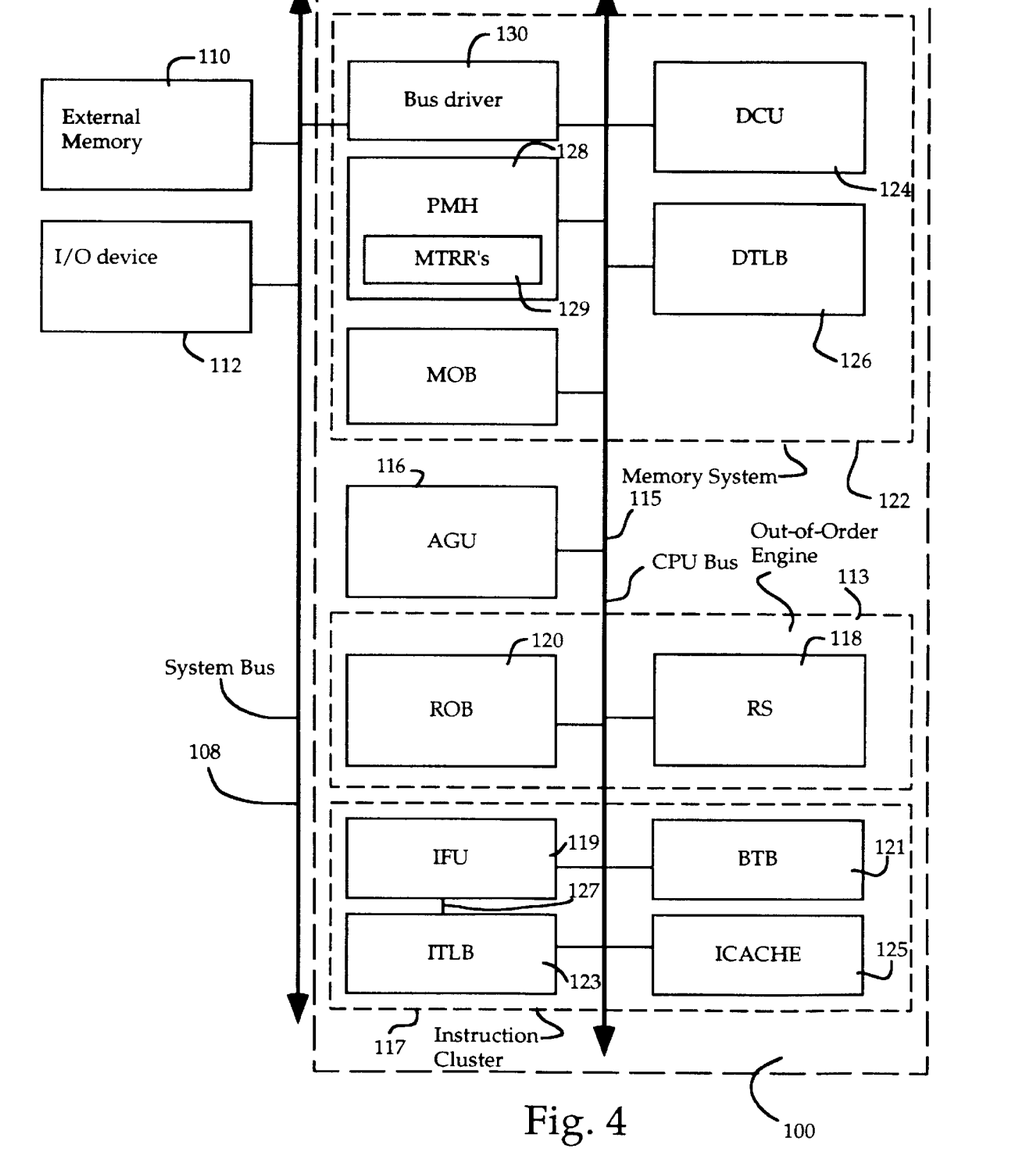
FIG. 4 is a block diagram illustrating functional components of one of the microprocessors depicted in FIG. 3 in accordance with one embodiment of the present invention.

FIG. 4 illustrates several functional components of microprocessor 100 of FIG. 3. In particular, FIG. 4 illustrates an instruction cluster 117 which performs branch predictions during instruction prefetching and which detects whether an instruction to be prefetched falls within memory mapped I/O or other uncacheable memory regions subject to possible side effects. If the instruction to be prefetched falls within these regions, instruction cluster 117 defers the actual fetching of the instruction until all previous branches have been detected and until any previous branch prediction is verified. Instruction cluster 117 includes an instruction fetch unit (IFU) 119, a branch target buffer (BTB) 121 and an instruction translation look-aside buffer (ITLB) 123. IFU 119 pre-fetches instructions based upon instruction pointers received from BTB 121 or other units (not shown).

Out-of-order engine 113 includes a reservation station (RS) 118 for allocating instructions that have not yet been executed, then dispatching the instructions to other functional units according to speculative data dependencies and according to the availability of the other functional units. Out-of-order engine 113 also includes a reorder buffer (ROB) 120 which stores speculative results from instructions dispatches by RS 118 and executed by one of the functional units. ROB 120 collects the results from speculative instructions, reorders the instructions, then retires the instructions. In other words, whereas the instructions may be dispatched from out-of-order execution engine 113 in an order other than the normal instruction sequence of the computer program, ROB 120 reorders the instructions to yield the sequence of operations specified by the computer program.

Each instruction processed by the ROB and RS has an opcode which uniquely identifies the instruction, and a value which identifies the "age", or temporal relation of the instruction to other instructions. Each instruction typically specifies some action to be taken, such as a memory LOAD or STORE operation.

The linear addresses for instructions dispatched by RS 118 are calculated by address unit 116. The instructions are dispatched from out-of-order engine 113 in either a protected mode or in a real mode. In protected mode, the linear address for the instruction is calculated by an address generation unit (AGU) 116. In real mode, AGU 116 calculates a physical address for the instruction. Instructions involving memory accesses are executed by a memory system 122, which includes a data cache unit (DCU) 124, a data translation look-aside buffer (DTLB) 126, a page mis-handler (PMH) 128, a memory system bus driver 130, and a memory ordering buffer (MOB) 132. DTLB 126 maintains a cache of address translations between linear addresses and corresponding physical addresses for data. In use, a instruction dispatched by RS 118 is intercepted from CPU bus 115 by DTLB 126 which performs a look-up to determine whether its internal cache lines contain the physical address corresponding to the linear address of the instruction. If a hit occurs, the physical address corresponding to the linear address is calculated based upon the tag entry value. The instruction is then updated to include the physical address and the instruction is re-dispatched on to CPU bus 115 for further processing. If a miss occurs, a page table walk is initiated to determine the physical address corresponding to the linear address of the instruction.

DCU 124 includes internal cache lines maintaining data for many of the most recently accessed memory locations. DCU 124 intercepts the instruction containing the physical address and accesses internal cache lines to determine if the data for the memory access of the instruction is already contained therein. If the data is contained within DCU 124, the data is retrieved from the internal cache lines and is dispatched onto CPU bus 115 for further processing by other functional units of microprocessor 100. If the data is not found within DCU 124, system bus driver 130 is accessed to transmit memory requests to external memory 110 to access the data specified by the instruction.

If the physical address for an instruction cannot be determined by the ITLB or the physical address for a memory LOAD or STORE cannot be determined from the DTLB, then PMH 128 performs a page table walk to determine the corresponding physical addresses. If an instruction causing a DTLB or ITLB miss is a non-speculative instruction, PMH 128 performs a non-speculative page table walk. If an instruction causing a DTLB or ITLB miss is a speculative instruction, then PMH 128 performs a page table walk speculatively.

MOB 132 orders memory accesses by maintaining lists of memory LOADs and STOREs and checks the LOADs and STOREs for possible adverse memory effects. MOB 132 reorders the memory access operations accordingly and may postpone execution of particular memory access operations until ordering problems are resolved. In particular, the MOB blocks execution of any memory instructions that are not ready for retirement and are known to be non-speculatable.

To prefetch an instruction, the IFU first accesses ITLB 123 to determine the physical address corresponding to the linear address of the instruction pointer. The IFU also determines the memory type of the page containing the instruction. If the information is unavailable from the ITLB a signal is sent to a PMH 128 which performs a page table walk to determine both the physical address and memory type corresponding to the linear address of the instruction to be fetched. Once the physical address and memory type are known, the ITLB is updated. IFU 119 examines the memory type to determine whether it corresponds to memory mapped I/O or any other generally uncacheable memory type. If the memory type is uncacheable, IFU 119 dispatches a permission-to-fetch instruction on CPU bus 115, then enters a stall mode.

The permission-to-fetch instruction is processed by out-of-order engine 113. Assuming no previous branch misprediction is detected, the permission-to-fetch instruction eventually retires as determined by ROB 120. Upon retirement, ROB 120 transmits a signal on line 127 to IFU 119 indicating that the instruction has retired. This signal is interpreted by IFU 119 as granting permission to fetch from the memory location pointed to by the current instruction pointer.

IFU 119 remains stalled until either permission is granted based on the permission-to-fetch instruction or until a previous branch misprediction is detected. If either condition occurs, IFU 119 switches from the stall mode to a normal operation mode where it either fetches the instruction that had previously been deferred or attempts to fetch a new instruction based upon a new, corrected pointer from the branch address calculator (BAC) or instruction execution unit (IEU). In the former case, IFU 119 dispatches a request to external memory to fetch the requested instruction. The instruction cache (ICACHE) is not accessed because it is already known that the instruction is stored within uncacheable memory. Hence, it is known that the instruction cannot be found within the ICACHE. If a new instruction is to be fetched, IFU 119 accesses ITLB 123 to determine the memory type and, if the memory type indicates that it is uncacheable, IFU 119 again dispatches a permission-to-fetch instruction and stalls until either permission is granted or until a previous branch misprediction is detected.

FIG. 4 is a block diagram illustrating functional components of one of the microprocessors depicted in FIG. 3 in accordance with one embodiment of the computer system of the present invention. It is appreciated that many of the elements shown in FIG. 4 in block diagram form may be realized in a variety of implementations and circuit configurations. For example, the single CPU bus illustrated in the Figures may actually comprise several separate buses having lines for linear addresses, physical addresses, and write-back results from the DCU. Also, the separate physical address bus may be interconnected only to the PMH, DTLB and DCU, i.e., not all units need access the physical addresses. The instruction cluster may include additional components such as a sequential instruction fetch unit, a microcode unit, an instruction decoder and an allocator unit. In other embodiments, integer and floating point units may also be included. Moreover, components such as the MOB, RS and ROB need not be included if the present invention is embodied in an in-order computer architecture.

Figure 5:
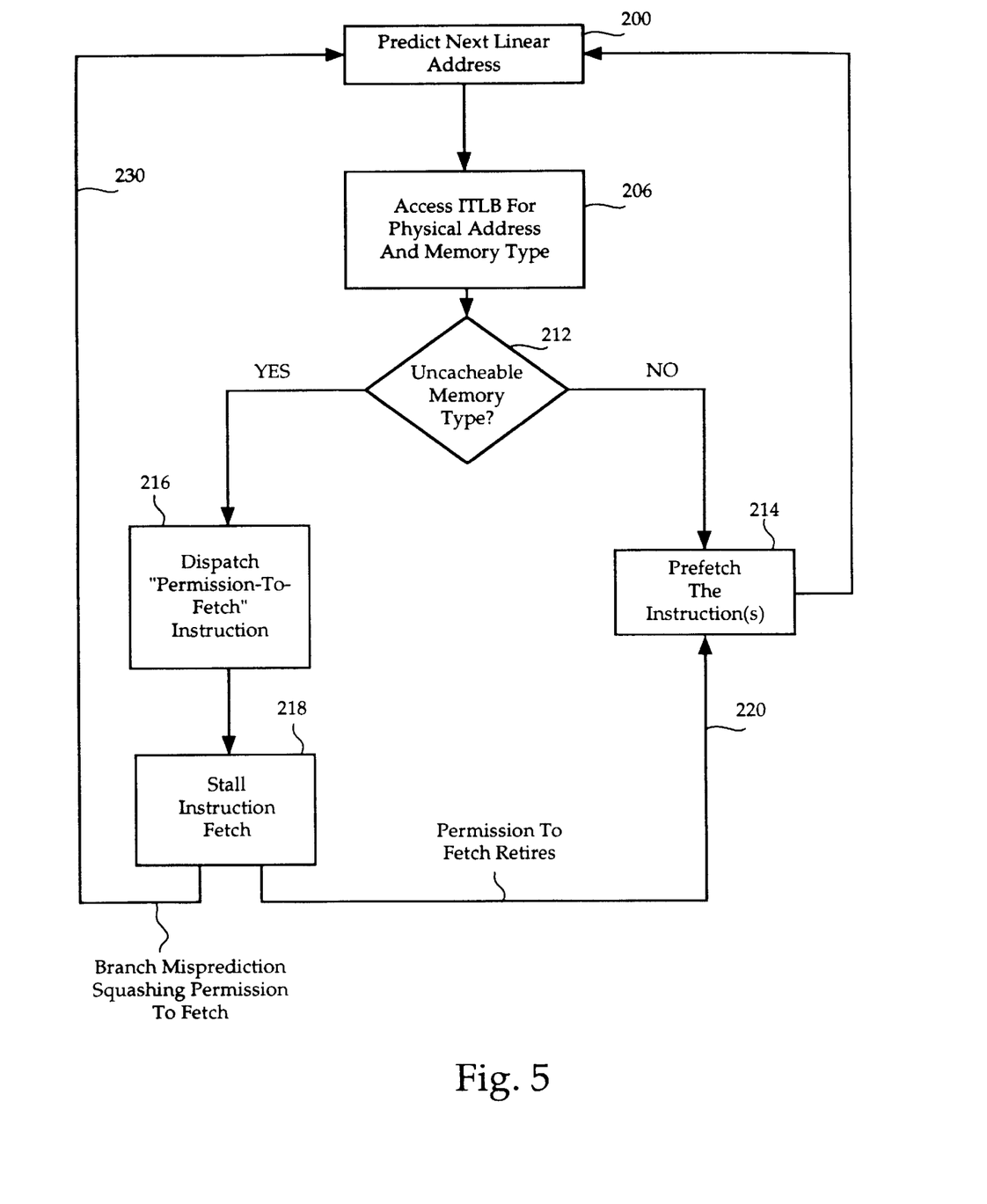
FIG. 5 is a flow chart diagram illustrating operations for one embodiment of the present invention.

With reference to FIGS. 4 and 5, IFU 119 is utilized to detect prefetches to uncacheable memory regions. To expedite the determination of the memory type for the instruction to be fetched, the ITLB cache should store memory types as well as physical addresses and linear addresses. Likewise, the PMH should also store memory types. FIG. 5 is a flow chart diagram illustrating the operation of IFU 119 for one embodiment of the present invention. Although the steps described in FIG. 5 are drawn in a sequential manner, it is appreciated that these steps are usually executed in a pipelined manner for maximum throughput.

At initial step 200 in FIG. 5, microprocessor 100 predicts the linear address of the next instruction to be fetched. Normally, a static prediction is made wherein IFU 119 fetches a predetermined number of bytes (e.g., 16 bytes) ahead of the last verified instruction pointer. However, IFU 119 may also receive an instruction pointer based on a branch prediction by the BTB, or based on an instruction pointer issued in response to the detection of a mispredicted branch. The instruction pointer received by IFU 119 specifies the linear address of the next instruction to be fetched. IFU 119 also determines which instruction is to be prefetched based upon the instruction pointer received at step 200. In one implementation, IFU 119 targets the instruction stored at the location identified by the instruction pointer, and the next five sequential instructions in memory. This is achieved by fetching 16 bytes (which typically contains about five instructions) per clock cycle in a pipelined manner.

Execution next proceeds to step 206 where IFU 119 accesses ITLB 123 to determine the physical address and memory type of the instruction (or instructions) to be prefetched. As explained above, ITLB 123 stores a memory type value with each entry containing a linear and physical address combination. The memory type value contains a code indicating whether the memory is uncacheable (e.g., memory mapped I/O) or cacheable (e.g., write-through memory, write-back memory, etc.). For efficient determination of memory types ITLB 123 operates both in real and protected modes in the embodiment described herein.

Step 212 is a decision point illustrating execution proceeding to the point where IFU 119 determines whether the memory type corresponds to uncacheable (UC) memory. If it is determined that the memory type is not UC, then execution proceeds to step 214 where the IFU simply prefetches the instruction(s). Prefetching involves first accessing ICACHE 125 to determine if the instruction to be fetched is already contained therein; if not, a request is transmitted on the external system bus to external memory to load the instruction. After the prefetch of step 214 has been completed, execution returns to step 200 where the IFU receives another instruction pointer identifying another linear address.

The loop defined by steps 200, 206, 212 and 214 may continue indefinitely until an UC memory type is detected at step 212. Once an UC memory type is detected, execution diverts to step 216 where IFU 119 dispatches a permission-to-fetch instruction onto the CPU bus. The permission-to-fetch instruction is similar to other instructions in that it includes an opcode indicating the relative age of the instruction.

Note that the permission-to-fetch instruction does not specify action to be taken by the microprocessor; that is, the permission-to-fetch instruction is effectively a dummy instruction. The permission-to-fetch instruction is allocated within RS 118 then received and reordered by ROB 120. Once all previously issued speculative instructions have retired, the permission-to-fetch instruction retires. This retirement is detected by ROB 120. Recall that once an instruction has been retired it is no longer subject to unresolved speculative instructions or branch predictions. Hence, retirement of the permission-to-fetch instruction is an assurance that a previous branch misprediction has not occurred. It also means that an instruction fetch may be performed at the current instruction pointer (unless the current instruction pointer itself lies within UC memory). A signal transmitted from ROB 120 on line 127 to IFU 119 indicates that a permission-to-fetch instruction has retired.

With continuing reference to FIG. 5, after the permission-to-fetch instruction has been dispatched the IFU is stalled, as indicated by step 218. Eventually, the permission-to-fetch instruction retires (arrow 220) or a branch misprediction is detected. If a branch misprediction is detected, all instructions dispatched following the mispredicted branch, including the permission-to-fetch instruction, are squashed (arrow 230). A new instruction pointer is then defined based on the correct branch and execution proceeds back to step 200. In following step 206, ITLB 123 is again accessed—this time to determine the physical address and memory type for the new instruction. As before, an ITLB miss may be detected and a page table walk performed. If the memory type is determined to be uncacheable another permission-to-fetch instruction is dispatched and the IFU is again stalled; otherwise, in the case of a cacheable memory type the instruction is fetched, as indicated by step 214.

As can be appreciated, depending upon the various memory types of instructions to be prefetched, the IFU may be repeatedly stalled pending resolution of branch conditions. It should be understood, however, for the embodiment described, only one permission-to-fetch instruction is pending at any given time. The single permission-to-fetch instruction either retires or is squashed upon the detection of a mispredicted branch.

Figure 6:
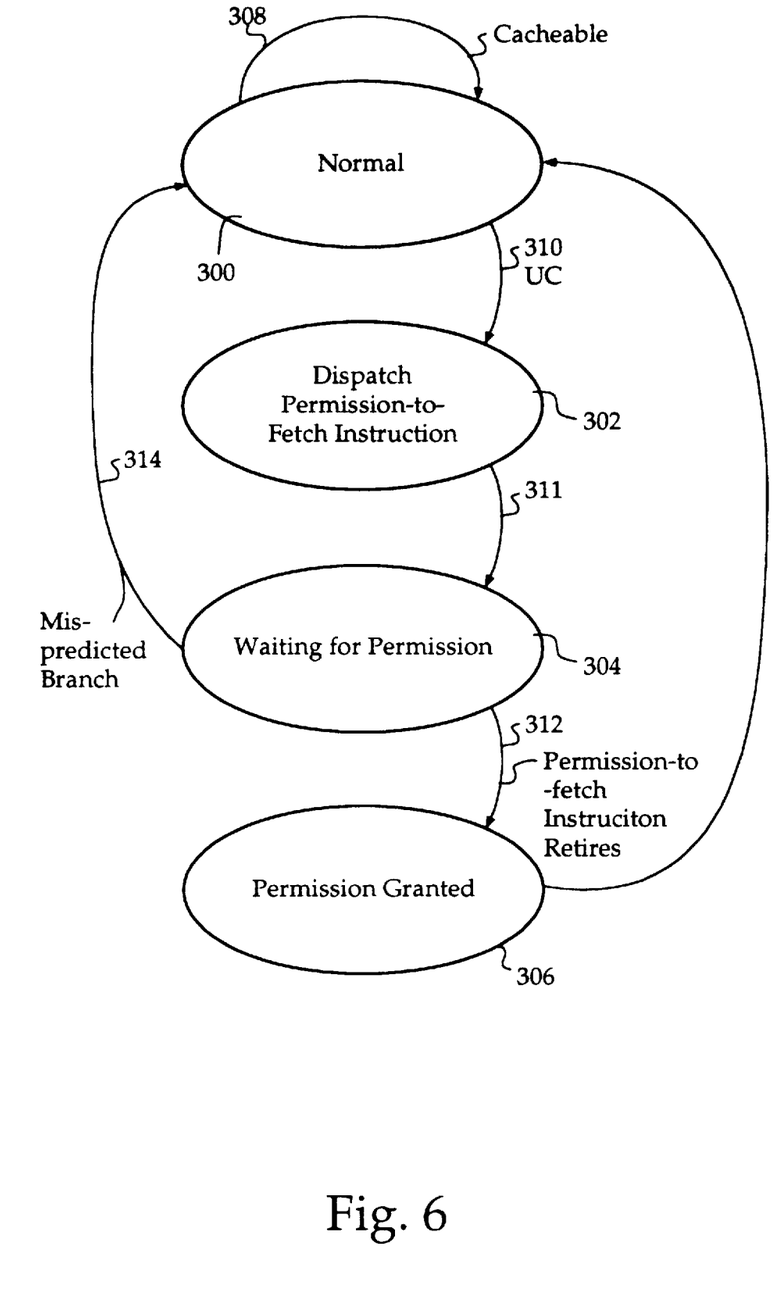
FIG. 6 illustrates various general states of the instruction fetch unit.

Various general states of IFU 119 are shown in the diagram of FIG. 6, including a normal state 300, a dispatch permission-to-fetch instruction state 302, a waiting for permission-to-fetch state 304 and a permission granted state 306. In normal state 300, IFU 119 determines whether the memory types are cacheable or not. Detection of a cacheable memory type causes IFU 119 to remain in normal state 300 (transition 308). Detection of an uncacheable memory type causes a transition 310 to state 302. After a permission-to-fetch instruction has been dispatched, a state transition 311 takes place to state 304, where IFU 119 waits for permission to proceed. Once permission is granted, IFU 119 transitions (transition 312) to state 306 where the IFU performs the UC fetch; eventually returning to state 300 via transition 316. On the other hand, if while waiting in state 304 a branch misprediction is detected—implying permission not granted—transition 314 returns the IFU back to normal state 300.

As discussed earlier, the determination of whether prefetching may proceed is depends upon an examination of the memory type value, which indicates whether the page containing the instruction to be fetched includes cacheable or uncacheable data. Practitioners in the art, however, will appreciate that there may exist other modes whereby the IFU is stalled.

By way of example, when a microprocessor is operating in SRAM mode all memory locations are regarded as uncacheable. In this case, IFU 119 does not examine memory type values since all memory types are assumed to be uncacheable. Another mode of operation is a "cache-locked" mode. In cache-locked mode ICACHE 125 is disabled and all memory types are regarded as uncacheable. Again, the microprocessor need not examine or process memory types when operating in this mode.

Although the exemplary embodiment provides storage or memory type values within the ITLB, in other implementations the memory type may be determined or tracked with other methods. Storage or memory type values within the ITLB provides a particularly efficient method since it obviates a separate access to main memory to determine memory type. Furthermore, although the exemplary implementation defines one memory type per page, in other implementations memory types may be assigned in accordance with alternative memory topologies. Hence, principles of the invention may be applied to a wide range of processors. In general, any processor capable of determining whether an instruction location is subject to uncacheable memory side effects can benefit from the present invention. Furthermore, the concepts invention may be applied to fetching of data, in addition, or as an alternative, to fetching instructions.

The microprocessors described herein may also be configured to provide opportunistic fetching, in addition to IFU controlled demand-type fetching. In opportunistic fetching, a bus controller identifies openings within the bus pipeline and exploits those openings for fetching additional instructions. In the exemplary embodiment described above, opportunistic fetching is allowed only within a given page. Opportunistic fetching is disabled once a page boundary is reached, or if an UC fetch is detected. Furthermore, opportunistic fetching is not enabled within a page until at least one demand fetch (a fetch command dispatched by the IFU) has been executed for that page.

By waiting until at least one demand fetch is executed, the IFU can be assured that the page either contains cacheable data before starting opportunistic fetches. Thus, once enabled, opportunistic fetching may safely be employed within the page. On reaching a page boundary, opportunistic fetching is disabled until another cacheable demand fetch occurs within a new page.

Whereas many alterations and modifications to the present invention will no doubt become apparent to the person of ordinary skill in the art after having read the foregoing description, it is to be understood that the particular embodiments shown and described by way of illustration are in no way intended to be limiting. For example, although this disclosure has described a particular computer system for detecting whether an instruction fetch risks corrupting memory mapped I/O, or other memory locations subject to side effects, and which defers the fetch until it can be assured that no undesirable side effects will occur, a variety of other system configurations are considered within scope of the present invention. For example, in another implementation, the computer system may utilize different techniques for determining whether an instruction fetch risks corrupting memory mapped I/O, or may implement other techniques for handling such problems should they be detected. Therefore, reference to the details of the illustrated diagrams is not intended to limit the scope of the claims which themselves recite only those features regarded as essential to the invention.

We claim:

1. A computer system that executes a sequence of instructions comprising:

a memory;

pointer means for specifying a next instruction to be prefetched from the memory;

means coupled to the pointer means for predicting a target of a branch instruction, and for subsequently determining a correctness of the target, wherein the branch instruction is earlier in the sequence relative to the next instruction, with the next instruction being included in a predicted path;

a buffer having a plurality of entries, an entry storing a memory type and a linear-to-physical address translation of the next instruction, the memory type indicating whether a location of the memory which stores the next instruction is cacheable;

a prefetcher coupled to the memory, pointer means, prediction means, and buffer, the prefetcher identifying the memory type associated with the next instruction and prefetching the next instruction from the memory when the memory type of the next instruction indicates a cacheable memory location; if the memory type of the next instruction indicates an uncacheable memory location, the prefetcher temporarily stalling until after the prediction means determines the correctness of the target.

2. The computer system of claim 1 wherein the pointer means further includes means for changing the next instruction to the target in the event that the prediction means subsequently determines a correct branch prediction.

3. The computer system of claim 2 wherein the prefetcher operates to prefetch the next instruction, and a set of sequentially-ordered instructions which immediately follows the next instruction, from the memory.

4. The computer system of claim 1 wherein the memory comprises an external memory storing the sequence of instructions and further comprising:

an instruction cache coupled to the prefetcher storing a plurality of instructions, the prefetcher accessing the instruction cache to determine whether the plurality of instructions includes the next instruction;

a system bus coupled to the external memory and the prefetcher, the prefetcher accessing the external memory to obtain the next instruction via the system bus should the plurality of instructions stored within the instruction cache not include the next instruction.

5. The computer system of claim 4 wherein the buffer comprises a translation look-aside buffer operating in a real mode.

6. The computer system of claim 1 wherein the memory is organized into pages and the system further comprises a page miss handler which determines the memory type of a particular page.

7. A computer system that executes a program which contains an ordered sequence of instructions comprising:

an execution pipeline;

a memory having pages, each page having an associated memory type indicating cacheability;

an instruction pointer mechanism that specifies a location in the memory containing an instruction of the ordered sequence to be prefetched;

an instruction translation look-aside buffer (ITLB) storing the associated memory type of the location and a linear-to-physical address translation of the instruction;

an instruction prefetching unit (IFU) coupled to the instruction pointer mechanism which prefetches the instruction from the location in the memory, the IFU accessing the ITLB to determine a physical address and the associated memory type of the instruction; if the associated memory type indicates a cacheable location, the IFU prefetches the instruction; otherwise, the IFU issues a dummy instruction and then stalls;

a reordering buffer (ROB) that determines when instructions can be retired, if the associated memory type indicates an uncacheable location, the ROB transmitting a signal to the IFU indicating that all instructions preceding the dummy instruction have retired, the IFU commencing prefetching in response to the signal;

a branch prediction mechanism which predicts a target of a branch instruction, the branch instruction being earlier in the ordered sequence than the instruction, if the branch instruction is mispredicted before the dummy instruction has retired, the execution pipeline squashing the dummy instruction and all other instructions subsequent to the branch instruction.

8. The computer system of claim 7 wherein the memory comprises an external memory storing the ordered sequence of instructions and further comprising:

an instruction cache coupled to the IFU storing a plurality of instructions, the IFU accessing the instruction cache to determine whether the plurality of instructions includes the instruction;

a system bus coupled to the external memory and the IFU, the IFU accessing the external memory to obtain the instruction via the system bus should the plurality of instructions stored within the instruction cache not include the instruction.

9. The computer system of claim 8 wherein the buffer comprises a translation look-aside buffer operating in a real mode.

10. The computer system of claim 8 further comprising a page mishandler which determines the associated memory type of each page.

* * * * *